United States Patent [19]

Korper, III

[11] 3,769,788

[45] Nov. 6, 1973

[54] LOW POLLUTION, HIGH EFFICIENCY PRIME MOVER SYSTEM AND PROCESS

[75] Inventor: George W. Korper, III, Woodbridge, Conn.

[73] Assignee: Conservor, Inc., New Haven, Conn.

[22] Filed: Mar. 9, 1972

[21] Appl. No.: 233,235

[52] U.S. Cl.............................. 60/19, 92/7, 92/172, 60/327, 60/414, 60/493
[51] Int. Cl......................... F02b 41/00, F02b 53/00
[58] Field of Search...................... 60/19, 14 R, 327, 60/414, 493; 92/7; 180/66 F

[56] References Cited
UNITED STATES PATENTS

| 225,351 | 3/1880 | Davies | 92/7 |
|---|---|---|---|
| 404,338 | 5/1889 | Blake | 92/7 |
| 2,863,426 | 12/1958 | Summerlin | 60/19 |
| 2,978,986 | 4/1961 | Carder et al. | 60/19 X |

Primary Examiner—Edgar W. Geoghegan
Attorney—John W. Malley et al.

[57] ABSTRACT

An engine system obtains maximum useful energy output from an internal combustion process by maintaining a substantially constant volume within a combustion zone during a completion of the combustion process and by providing for a nearly complete expansion of heated gas after completion of the combustion process. The engine includes a piston mounted for movement within a chamber, and the piston is retarded from initiating an expansion stroke movement until nearly theoretical maximum pressure and heat conditions are developed within a combustion zone within the chamber. Thereafter, the piston is released to apply a motive force to a volume of hydraulic fluid contacted by the piston within the same chamber. The expansion stroke of the piston is substantially longer than its compression stroke. A specific embodiment provides for constant pressure delivery of hydraulic fluid by auxiliary hydraulic devices which function to maintain a substantially constant force differential on opposite sides of the piston during its expansion stroke travel.

A new practical working cycle designated the "Korper" cycle extracts as mechanical energy, thermal energy wasted in previous internal combustion, attempted constant volume designs such as the Otto or Atkinson cycles by providing for complete combustion prior to expansion and a longer expansion than compression stroke.

39 Claims, 14 Drawing Figures

FIG. 4 IDEAL CONSTANT VOLUME INTERNAL COMBUSTION CYCLE

FIG. 5 CONSTANT VOLUME OTTO CYCLE

FIG. 6 CONSTANT PRESSURE DIESEL CYCLE

FIG. 7 CONSTANT VOLUME HIGH PRESSURE KORPER CYCLE

LOW POLLUTION, HIGH EFFICIENCY PRIME MOVER SYSTEM AND PROCESS

BACKGROUND AND BRIEF SUMMARY OF INVENTION

The present invention relates to improvements in an internal combustion engine system which includes an improved combustion process and a hydraulic system having a volume of hydraulic fluid to be moved to a motor or other power usage device. The engine system and internal combustion process of the present invention are characterized by low pollution and high efficiency operations, thereby lending themselves to prime mover requirements.

It is known that the most efficient internal combustion cycle is an ideal constant volume cycle which allows for addition of heat energy to a gas maintained at a constant volume prior to its expansion and which allows for a complete expansion of the heated gas thereafter. The efficiency of an ideal constant volume internal combustion cycle is represented by a calculation of $1 - 1/r\, \gamma - 1$ wherein r equals the compression ratio and gamma is the ratio of the specific heats of the gases at constant pressure and constant volume.

Practical working engine designs have attempted to attain theoretical efficiencies of the ideal constant volume cycle, but prior art design limitations have resulted in engine constructions which are substantially less efficient than a theoretical efficiency for the design. Innovators in this art have known for a long time that a number of factors contribute to the design of an engine which will operate as close to an ideal constant volume cycle as possible, but attempts to apply all known factors to a given design have resulted in various compromises which contribute to a reduction in efficiency. For example, as early as 1862 Alfonse Beau DeRochas outlined factors that should be considered in a practical working engine design. It was suggested that there should be a high expansion ratio, or a longer expansion stroke than compression stroke, so as to allow for a maximum expansion of heated gases within the engine. It was also indicated that there should be a high compression ratio to develop maximum pressure of an ignition charge. This factor is based upon a basic rule of all heated gas cycles that the highest temperature, and therefore the highest pressure, that can be provided prior to combustion (generally referred to as the compression ratio) increases the efficiency of the cycle. It was also noted by DeRochas that an ideal engine design should run with low mechanical losses and low heat losses and should be provided with a maximum cylinder volume for the smallest cylinder surface area so as to reduce heat transfer losses.

There are known internal combustion engine cycles which have been designed in an attempt to maximize efficiency of heat generating processes to transform heat energy to a useful work output. One type of known design, identified as the conventional Otto cycle, provides for addition of heat energy into a combustion chamber while the volume of the chamber is maintained at a constant for a major part of the heat generating process. Then, the gases contained within the chamber are allowed to expand, thereby moving a piston within the chamber, and the heat energy is transformed to a work output. Theoretically, an Otto cycle would like to provide for a maximum pressure development during the heat addition phase of the cycle, followed by an expansion which would continue to completion, as in the ideal constant volume cycle. In practical application, the work output and efficiency of the Otto cycle is substantially less than a theoretical value because of a number of heat losses inherent in known apparatus for carrying out the cycle. A major heat loss occurs when an exhaust valve is opened to purge combustion products from a combustion chamber prior to complete expansion of heated gases within the chamber. This inherent limitation of a practical application of the Otto cycle is, for the most part, a result of an interconnection of one or more pistons within respective chambers to a crank which prevents a full control of piston movement during its expansion and compression strokes within the chamber. This results in premature heat rejection from the system when an exhaust valve is opened, and thus, the Otto cycle fails to match the ideal constant volume, internal combustion cycle at a very critical part of the cycle. Another loss in theoretical work output from known apparatus operating on the principle of the Otto cycle occurs as a result of an inability to maintain a true constant volume within a combustion chamber during full completion of a heat-generating combustion process within the chamber. Again, this loss is due, in part, to a practical requirement which ties a piston to a rotating crank, thereby resulting in an initiation of expansion movement of a piston just prior to full completion of a combustion process within a combustion chamber.

Another form of combustion process, usually referred to as a Diesel cycle, maintains a substantially constant pressure within the combustion zone during a combustion process. Nearly maximum pressure develops in the combustion chamber during a compression stroke of a piston which establishes a sufficient compression to initiate ignition of a fuel mixture. Ignition is followed by an immediate expansion of gases within the combustion zone, thereby initiating an expansion stroke for the piston in a way which maintains a substantially constant pressure (with an expanding volume) during completion of the combustion process. Thus, the Diesel cycle is not as efficient as a constant volume cycle because heat is added to the system while a piston is moving in its chamber in a direction that prevents maximum pressure maintenance during heat addition. Furthermore, the Diesel cycle requires heat rejection from the system prior to full expansion of heated gas in the system, as in the Otto cycle, and this results in a major loss in efficiency when compared to an ideal constant volume cycle.

The combustion process of the present invention represents an improvement over the processes discussed above, and the work output cycle of the present invention more closely matches the theoretical values offered in an ideal constant volume cycle. Although the cycle of this invention may comprise a compression ignition process typical of Diesel combustion, a characeristic feature of the improved process is one of maintaining a substantially constant volume within a combustion zone during nearly full completion of the combustion process within the zone, followed by a very complete expansion of gases within a chamber to produce a maximum work output with a minimum of heat loss from the system. The expansion stroke of a piston operating in the process of the present invention is substantially greater than its compression stroke, and this is accomplished without mechanical complexities which reduce available work output (as, for example, in the so-called Atkinson arrangement which provides for an increased expansion stroke through complex mechanical linkages).

In accordance with the present invention, a combustion process primarily maximizes useful energy output available from an application of heat energy to a piston means carried within a chamber by (a) maintaining a substantially constant volume within a combustion zone portion of the chamber during substantial completion of a combustion process initiated in its combustion zone so as to develop pressure and heat conditions approaching theoretical maximums for the combustion process prior to any increase in volume of the combustion zone, and (b) continuing an expansion stroke of the piston after completion of the combustion process so as to allow substantially complete expansion of heated gas within the chamber in which the piston is moving. In addition, the engine design of this invention provides for a very high compression ratio, a relatively low speed operation which reduces mechanical and frictional heat losses, an improved lubrication and insulation to reduce other thermal losses, and a use of supercharging and scavenging to improve burning efficiencies and characteristics.

A particular application of the combustion process of the present invention to a work output system provides for a pumping of hydraulic fluid from the same chamber in which a piston is mounted for receiving heat energy from a combustion process. Further improvements of the process provide for a control of piston movement so as to maintain a substantially constant force on the piston while the piston is pumping hydraulic fluid. This results in a delivery of hydraulic fluid at a substantially constant pressure to a hydraulic motor or other power usage device.

The invention also provides for engine designs capable of carrying out the novel combustion process and delivery of hydraulic fluid discussed above. In its simplest form, an engine design of the present invention includes a piston and chamber combination in which an internal combustion process can be carried out for applying a motive force to the piston and for imparting the motive force of the piston to a volume of hydraulic fluid supplied to the same chamber. The piston functions to seal the hydraulic fluid from the combustion process within the chamber. The engine further includes gas supply and fuel supply means for delivering a combustible fuel mixture to a combustion zone within the chamber. The fuel is ignited in any known manner, including by compression ignition, and the piston is arranged to pump hydraulic fluid out of the chamber after a combustion process has been substantially completed.

The engine of this invention is characterized by its provision for a control of piston movement so as to (a) retard movement of the piston away from its maximum compression position, to thereby maintain a substantially constant volume within the combustion zone, during substantial completion of the combustion process to develop nearly theoretical maximum pressure and heat conditions within the combustion zone prior to any increase in volume of the gases therein, and (b) to release the piston for movement through a controlled expansion stroke which maximizes work output and which minimizes heat losses from the combustion process. Final exhausting of combustion products from the chamber takes place upon completion of a relatively long expansion stroke as compared to the compression stroke of the piston.

A particular embodiment of the engine of this invention provides for first and second piston means mounted in respective chambers in an opposed relationship so that the two pistons can alternately pump hydraulic fluid into a closed circuit.

Each piston receives a motive force from an internal combustion process and applies the motive force to hydraulic fluid supplied to its associated chamber. The first and second piston means are mounted and interlinked relative to each other so that when a motive force is applied to one of the pistons to pump hydraulic fluid from its associated chamber, a portion of that force is transferred to the other piston to cause hydraulic fluid to be drawn into its associated chamber. A closed hydraulic circuit is in flow communication with the two piston chambers to receive a flow of high pressure hydraulic fluid from each of the pistons for ultimate delivery to a motor means or other power usage device included in the circuit. A low pressure reservoir supply of hydraulic fluid is connected to deliver hydraulic fluid to the chambers of each of the pistons in accordance with directions of reciprocation of the pistons.

In a preferred embodiment of the invention, a motive force control means is included in combination with a basic engine design to control pumping action of one or more pistons to thereby produce a substantially constant delivery of hydraulic fluid in a hydraulic circuit. The motive force control means comprises auxiliary hydraulic devices, in the form of one or more auxiliary piston and chamber combinations, which function to offer a variable resistance to travel of a given piston means during a first half of expansion stroke, varying from a maximum resistance when piston travel is initiated after maximum compression to a zero resistance at the half-way point of travel of the piston, and to offer a variable assistance to travel of the same piston during a second half of its expansion stroke, varying from zero assistance when the piston is at its half-way point of travel to a maximum assistance at the end of the expansion stroke of the piston. This arrangement is somewhat similar to a steam engine control suggested by J. D. Davies in U. S. Pat. No. 225,351, although Davies did not provide the other features of an improved combustion process combined with a hydraulic circuit, as are provided by the present invention.

The internal combustion process and engine of the present invention offers advantages of high thermal efficiency in a two-stroke engine arrangement which operates at relatively low friction because of a low piston velocity. The engine system can be easily constructed and maintained and can be provided with features of super-charging and scavenging of its combustion zones. The combination of a hydraulic system with the internal combustion system of the present invention substantially reduces blow-by losses from the combustion zone. The hydraulic fluid included in the hydraulic system can provide for lubrication and cooling of the engine in addition to its primary function as a fluid means for transferring a motive force.

The combustion process and engine of this invention offers features of operation which result in a more complete combustion of a fuel mixture to thereby reduce pollution effects on the atmosphere. Many types of fuel, including fuels may be used with the process of the present invention, and the fuel is burned with an excess of oxygen in the combustion chamber, thereby eliminating or reducing carbon monoxide in the exhaust product. Burning time is much longer than provided in engines of known design, and therefore certain aromatic hydrocarbons are more completely burned and disassociated in the burning process. Nitrogen oxides do not tend to form because of lower average combustion temperatures. The exhaust products of the engine can be further treated with a water bath or other treatments, if desired.

The crude oil used as fuel may be used as the hydraulic fluid of the system.

These and other features and advantages of the present invention will be discussed in greater detail below. In that discussion reference will be made to the accompanying drawings as briefly described below.

DETAILED DESCRIPTION OF INVENTION

Figure 1:
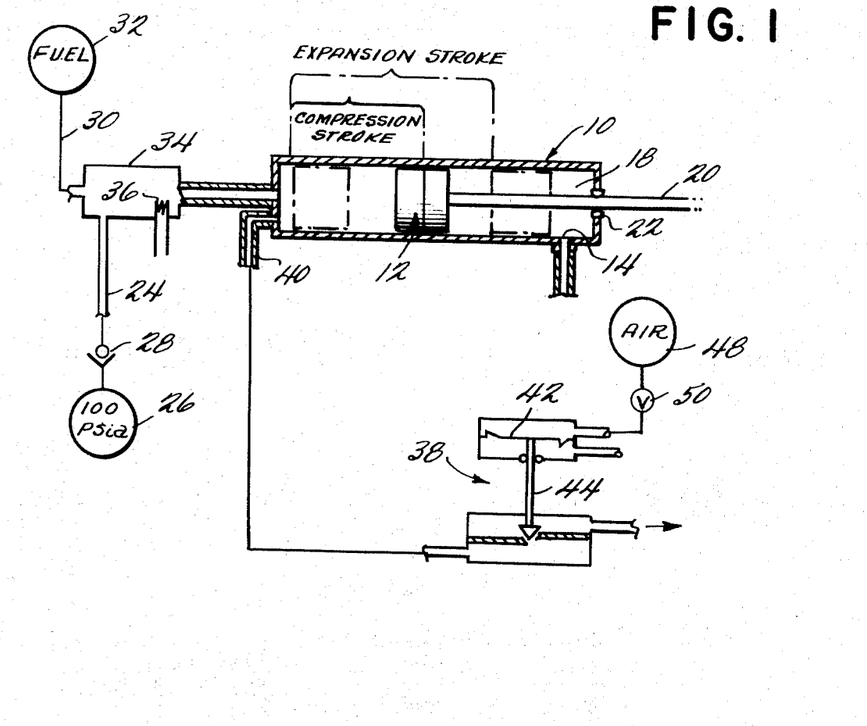
FIG. 1 is a highly schematic view of a basic engine design of this invention, with certain air and fuel supply conduits and exhaust control conduits shown as lines of circuit diagrams.

The basic relationships of the improved engine design of the present invention are illustrated in FIG. 1. As shown, the engine includes a chamber means 10 for containing an internal combustion process and for receiving and discharging a flow of hydraulic fluid. A piston means 12 is mounted within the chamber means 10 for receiving a motive force from the internal combustion process contained within the chamber means and for imparting a motive force to a volume of hydraulic fluid supplied to the chamber means through a port at 14. In the illustrated embodiment the chamber and piston are of a known cylindrical cross-sectional configuration, but other configurations may be used. The piston means is fitted for reciprocal movements within the chamber means 10 so as to provide for relatively low friction during relative movement while, at the same time, providing for a sealing of internal spaces at opposite ends of the chamber means from each other. A space 16 within one end of the chamber means comprises a combustion zone, and a space 18 at an opposite end of the chamber carries a volume of hydraulic fluid. The illustrated arrangement provides for a piston rod 20 connected to a suitable means for reciprocating the piston in a compression stroke (toward the left in the FIG. 1 view). A seal 22 of known structure is provided around the piston rod 20 in the section where the piston rod passes through an aperture formed in an end wall of the chamber so as to seal hydraulic fluid within the chamber.

The basic arrangement of FIG. 1 also includes a gas supply means 24 for delivering a combustion supporting gas to the combustion zone 16 within the chamber means 10. The gas supply line 24 is connected to a source of compressed air, or other oxygen containing gas, which is preferably under a pressure above atmospheric pressure conditions and which is delivered from a source 26 to the gas supply line 24 through a one-way check valve 28. The check valve 28 is arranged to provide for a continuous delivery of combustion supporting gas to the gas supply line 24 whenever pressure conditions on the downstream side of the check valve 28 are less than the compressed pressure conditions within the source of supply 26. In the illustrated embodiment, combustion supporting gas is supplied from a container under a pressure of 100 psia and therefore gas is delivered into the combustion zone 16 whenever pressure conditions within the system are below that level. When pressure conditions exceed 100 psia, as for example during compression and ignition of a charge within the combustion zone 16, the check valve 28 closes the gas supply line 24 and prevents a back-up of gases into the supply container 26.

A fuel supply line 30 connected to a source of fuel 32 feeds fuel to an injector or chamber 34 on a timed basis, in a manner known to this art, so that metered quantities of fuel are mixed with the combustion supporting gas prior to introduction of the mixture into the combustion zone 16. The just-described arrangement is typical of fuel injector systems known in the art, and other fuel delivery and mixing systems may be utilized for introducing a fuel charge into the combustion zone 16.

The arrangement shown in FIG. 1 is intended to show a compression ignition, two cycle internal combustion process which does not require the use of a sparking device to carry out the process on a continuous basis. However, a glow plug or wire 36 may be included in the fuel injection device 34 for initiating a first burning of a fuel mixture to start an operation which thereafter continues with repeated ignitions generated by a compression of gases within the combustion zone 16. Exhausting means 38 (shown in a very schematic and very exaggerated form for clarity) includes an exhaust valve structure for opening and closing an exhaust line 40 on a timed basis to permit a removal of combustion products from the chamber 10 upon completion of each expansion stroke of the piston means 12. The exhaust valve is shown as being operated by air pressure differential across a bellows or diaphragm 42 which, in turn, actuates a valve stem 44 and valve closure 46 in a known manner. Air is supplied from a source 48 through an electrical control valve 50 to an upper portion of the diaphragm assembly to urge the valve closure 46 into a position which blocks removal of exhaust products from the chamber 10. Upon completion of an expansion stroke of the piston 12, the air valve 50 is closed, thereby allowing an opening of the valve closure 46 resulting from a slow leakage of air, through a vent (not shown), in the chamber above the diaphragm. The lower side of the diaphragm assembly is vented to the atmosphere. An alternative arrangement provides for a hydraulic control of the exhaust valve.

FIG. 1 shows the piston 12 at its approximate half way point of travel along the length of the chamber 10. A dotted line position of the piston is shown on the left-hand side of the drawing to illustrate a maximum compression position for the piston corresponding to completion of its compression stroke and initiation of a heat generating combustion process within the combustion zone 16. A dotted line position is shown at the right-hand side of the FIG. 1 view to illustrate the extreme limit position of the piston at the end of its expansion stroke. As previously explained, a compression stroke is applied to the piston 12 through the piston rod 20 from a suitable source of power. For purposes of discussions and claims in this specification, the compression stroke is defined as the length of travel of the piston means 12 in a first direction from the point at which the exhausting means 38 is closed to the point at which maximum compression takes place. The expansion stroke of the piston is defined herein as the length of travel of the piston means in an opposite direction from the compression stroke, as measured from a point at which maximum compression takes place to a point at which the exhaust valve of exhausting means 38 is opened to discharge combustion products from the chamber 10. As shown, the engine design of the present invention provides for an expansion stroke which is much longer (approximately twice as long) than the compression stroke, thereby providing for a maximum transformation of heat energy into work energy during expansion travel of the piston means 12. Although the compression and expansion strokes are defined with reference to the point at which "maximum compression" takes place within the chamber means 10, this is to be understood as a slightly variable point in the travel of the piston means 12 relative to its associated chamber means 10. This is possible because of a unique characteristic of the engine design, which will be more fully described hereinafter, wherein it will be explained that the piston means 12 is relatively free to travel and to receive control functions which are not tied to mechanical cranks or other devices which necessarily set precise limits of travel on a piston relative to a chamber. In fact, the arrangement of the preferred embodiment is such that compression ignition can take place at a natural or ideal point during compression travel of the piston means so as to adjust to varying fuel and burning conditions which typically develop in internal combustion processes. It is a further characteristic of the engine of this invention that the piston means 12 can be essentially "locked" into its natural maximum compression position to allow substantial completion of a heat generating combustion process and its resultant development of nearly theoretical maximum pressure and heat conditions within the combustion zone 16 prior to any increase in volume (initiation of travel of the piston means 12) of the combustion zone 16. Although not illustrated in FIG. 1, the means for "locking" the piston in its maximum compression position comprises a hydraulic means which retards premature movement of the piston away from its maximum compression position. The same hydraulic means provides for an eventual release of the piston means after substantial completion of the combustion process to thereafter allow a full expansion stroke travel of the piston means. During its expansion stroke (toward the right in FIG. 1) hydraulic fluid is contacted by the piston means within the chamber means 10 and is discharged therefrom through the port 14 at a high pressure.

Figures 2, 3:
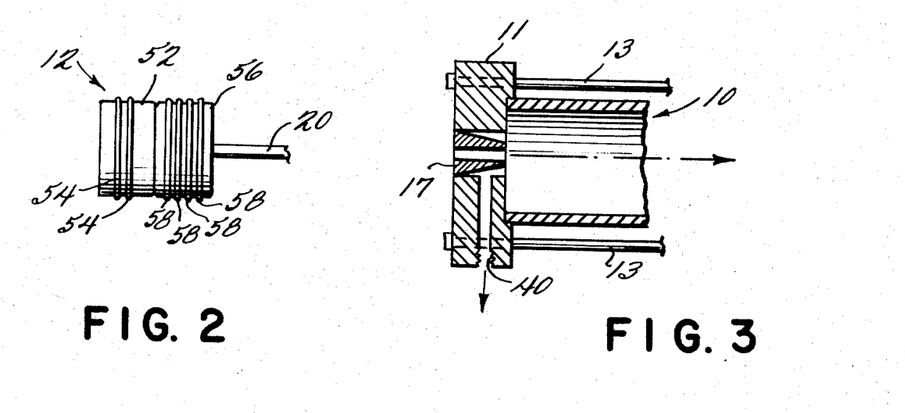
FIG. 2 is an enlarged view of a compound piston structure which may be used with the engine of this invention.
FIG. 3 is an enlarged view of a cylinder head assembly for the engine of this invention, as shown on the same scale as FIG. 2.

FIG. 2 illustrates a type of compound piston construction which may be used with the engine of this invention to seal a combustion process from a hydraulic system. A first piston section 52 is formed from a metal material coated with ceramic to withstand the high temperatures of the combustion process within the combustion zone 16. The piston section 52 is provided with steel piston rings 54 of known construction and material to seal the outer perimeter of the piston relative to the inner wall of its associated chamber. A second piston section 56 is formed from a metal material and provided with a series of grooves about its circumferential surface to receive Teflon O-rings 58, of known construction and design, to effect a high pressure seal of hydraulic fluid within the chamber.

FIG. 3 illustrates a type of cylinder head assembly used with the engine of this invention. A head member 11 is fitted at each end of the cylinder 10 and the assemblies are tightly secured with a number of rods 13 extending between the two heads (only one shown). One head is bored at 15 to receive a fuel and air injection nozzle 17 having a tapered outer configuration so that exhaust products can be removed from the chamber by way of an annular space around the nozzle communicating with an exhaust bore 40 formed radially into the head member. This arrangement provides for an injection of fuel, and in addition scavenging air travels the full length of the cylinder 10, thereby resulting in a removal of exhaust products from the cylinder.

Figure 5:
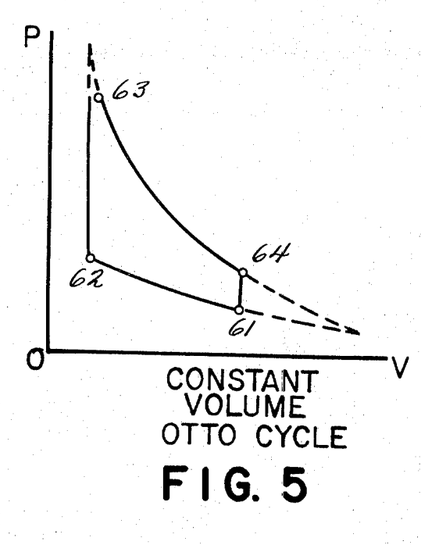
FIG. 5 is a graphic representation of pressure-volume characteristics of an Otto cycle.
Figure 6:
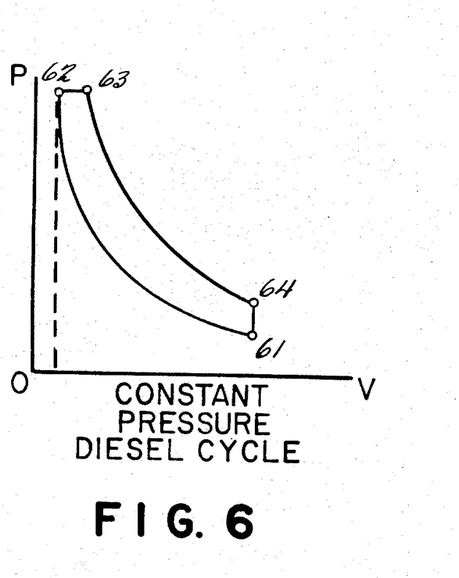
FIG. 6 is a graphic representation of pressure-volume characteristics of a Diesel cycle.
Figure 7:
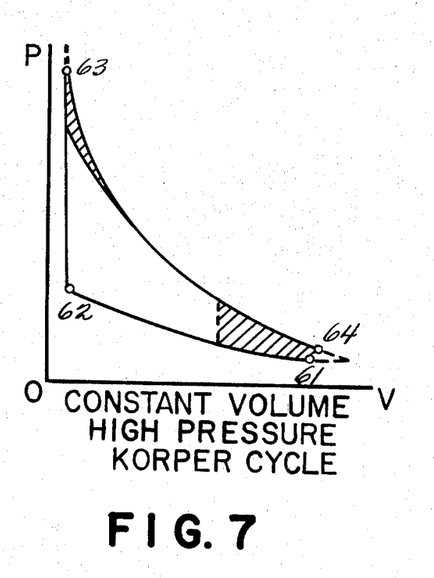
FIG. 7 is a graphic representation of pressure-volume characteristics of the cycle of the present invention.

FIGS. 4 – 7 graphically portray theoretical pressure-volume relationships for certain known gas systems (FIGS. 4 – 6) as compared to the system of the present invention (FIG. 7). The horizontal axis of each graph indicates volume of a gas included in the system, and the vertical axis of each graph indicates pressure (typically psia) of the graph within the system.

Figure 4:
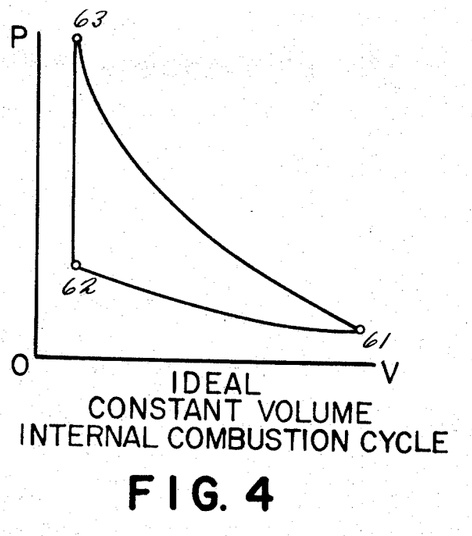
FIG. 4 is a graphic representation of pressure-volume characteristics of an ideal constant volume, internal combustion cycle.

FIG. 4 portrays a theoretical constant volume internal combustion cycle in which a volume of gas is heated and expanded to transform heat energy into a work output. As illustrated, the gas volume is compressed between points 61 and 62, after which it is maintained at a constant volume while heat energy is added to the gas between points 62 and 63. Upon completion of heat energy addition, the gas is allowed to expand back to its initial pressure at 64, and nearly all of its added heat energy is transformed to a work output, thereby resulting in a cooling of the gas back to its starting temperature. The work output of this cycle is represented by the area enclosed by the lines connecting coordinates 61, 62, 63 and 64.

The ideal constant volume cycle of FIG. 4 represents a theoretical situation which ideally produces a complete conversion of heat to work with no heat losses from the system. This theoretical ideal is not attainable in a practical application of the theory to internal combustion processes and engine designs. Certain work losses, such as frictional losses (conversion of some work output back to heat) and losses from incomplete heat generation by a combustion process are inherent in all known prior art processes and engine designs. Other losses are inherent in selected engine designs because of basic characteristics of the engine designs.

For example, FIG. 5 compares the known Otto cycle of a constant volume reciprocating piston engine to the ideal situation of FIG. 4 (shown in FIG. 5 with dashed lines). The Otto cycle engine provides for a compression of a volume of combustible gas from point 61 to point 62 by movement of a piston within a chamber. At point 62 the compressed gas is ignited with a spark, and there is a rapid addition of heat to and increase in pressure of the gas between points 62 and 63. Typically, the piston of an Otto cycle engine is tied to a crank so as to transform the reciprocating motion of the piston to a rotary motion of the crank. This arrangement prevents a control of piston position during addition of heat to the system, and the piston is free to move away from its maximum compression position as soon as the pressure build-up in the chamber is sufficient to initiate movement. Thus, a peak theoretical pressure increase is not attained at point 63 (compared to ideal peak pressure) because the piston begins a premature reciprocation within its chamber, resulting in an expansion and cooling of the gas prior to completion of heat addition. Thus, there is a loss in work output from the system.

A further and substantial work loss occurs in the known Otto cycle engines between points 64 and 61 where heat energy is actually rejected from the system without fully expanding the heated gas of the system to perform useful work. This is because of a design requirement to open an exhaust valve in the chamber at an early point before the piston begins a return compression stroke, as dictated by the crank (and flywheel) to which the piston is linked. Opening of the exhaust valve prior to complete expansion of the gas within the system results in an immediate drop in pressure and loss of heat between points 64 and 61. Thus, the known Otto cycle is substantially less efficient than the ideal constant volume cycle which it attempts to imitate.

FIG. 6 portrays a typical compression ignition, or Diesel, cycle in which substantially peak pressure conditions of a combustible gas are attained during a compression stroke (between points 61 and 62) of a piston. Ignition of the gas occurs at 62 and heat generation continues to point 63. It can be seen that there is an immediate expansion of gas between 62 and 63, resulting in a constant pressure characteristic during the burning portion of the process. Thus, there is a loss of work output by a failure to maintain the gas at a constant volume during completion of the heat generating process. In addition, there is a work loss between points 64 and 61 because of heat rejection from the system prior to completion of full expansion of the heated gas.

FIG. 7 compares the engine and process of the present invention to the cycles discussed above. As illustrated, there is a compression stroke of a piston between points 61 and 62, as with the Otto cycle engine. This is followed by an ignition of a combustible gas between points 62 and 63 while maintaining the piston at its maximum compression position for the entire period of heat addition to the system. Unlike the Otto cycle, the cycle of this invention may ignite the compressed gas by a very high compression of the gas within the system, and unlike the Diesel cycle, expansion of the heated gas is not permitted until completion of heat addition. Thus the cycle of this invention may take the form of a compression ignition (Diesel type), constant volume (Otto type) process capable of developing very high pressure in a heated gas system. The shaded area at the top of the graph of FIG. 7 represents the increase in work output of the process of this invention as compared to an Otto cycle. However, this increase is magnified even more when the process of this invention is carried out at very high attainable pressures (with high compression ratio piston travel) and with a combustible gas which is pre-compressed prior to introduction into the system.

FIG. 7 further depicts a substantial increase in work output at the lower end of the graph (shaded area indicating increase over Otto cycle) resulting from a relatively long expansion stroke of a piston without an early rejection of heat from the system. This is possible because of a novel engine design which does not require a premature reciprocation of a piston, as dictated by a crank or other mechanical burden on the piston.

Thus, the process and engine design of this invention closely approximate theoretical work output efficiencies of the ideal cycle of FIG. 4.

Figure 8:
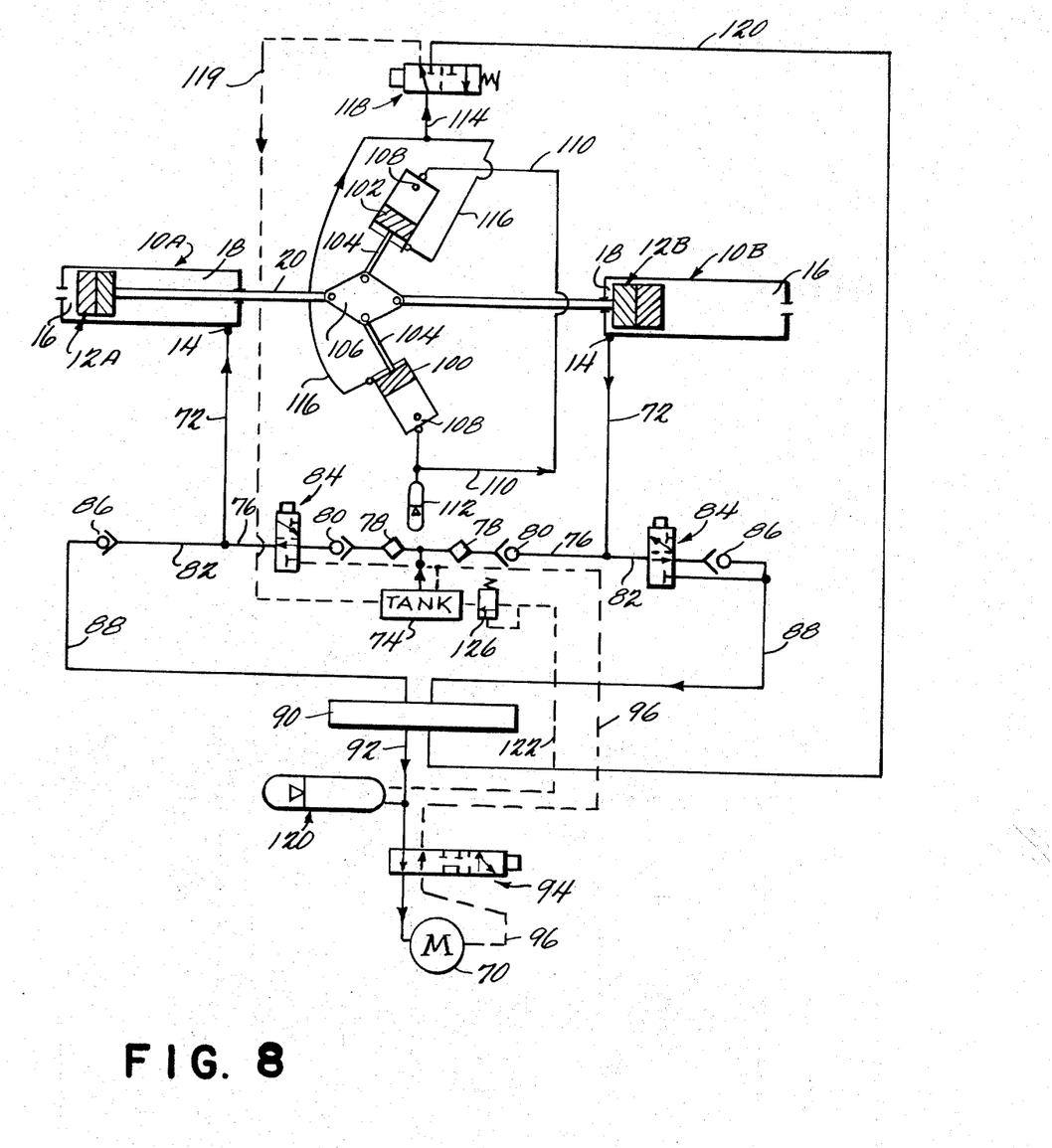
FIG. 8 is a schematic illustration and circuit diagram for a preferred engine design of this invention as combined with a closed hydraulic circuit for delivering hydraulic fluid at a constant pressure to a motor or other work usage device.
Figure 9:
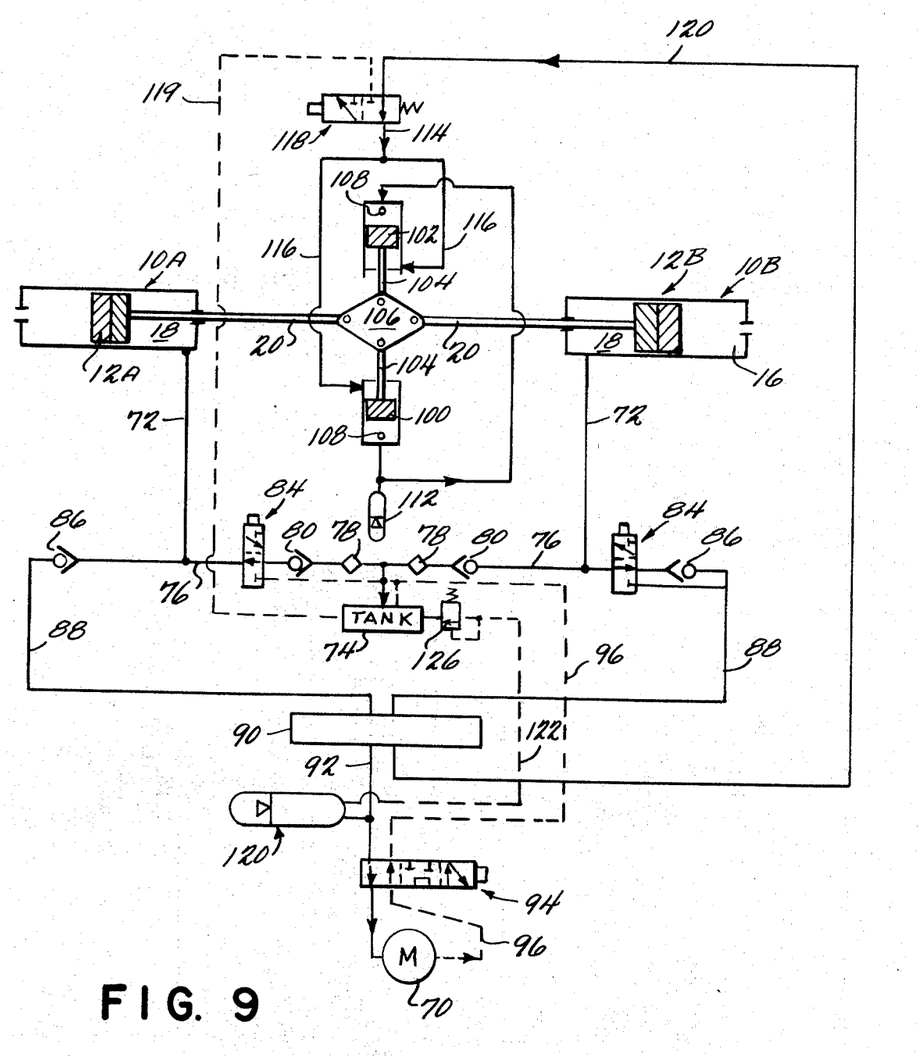
FIG. 9 is a view similar to FIG. 8 but showing the system in a different state of operation.
Figure 10:
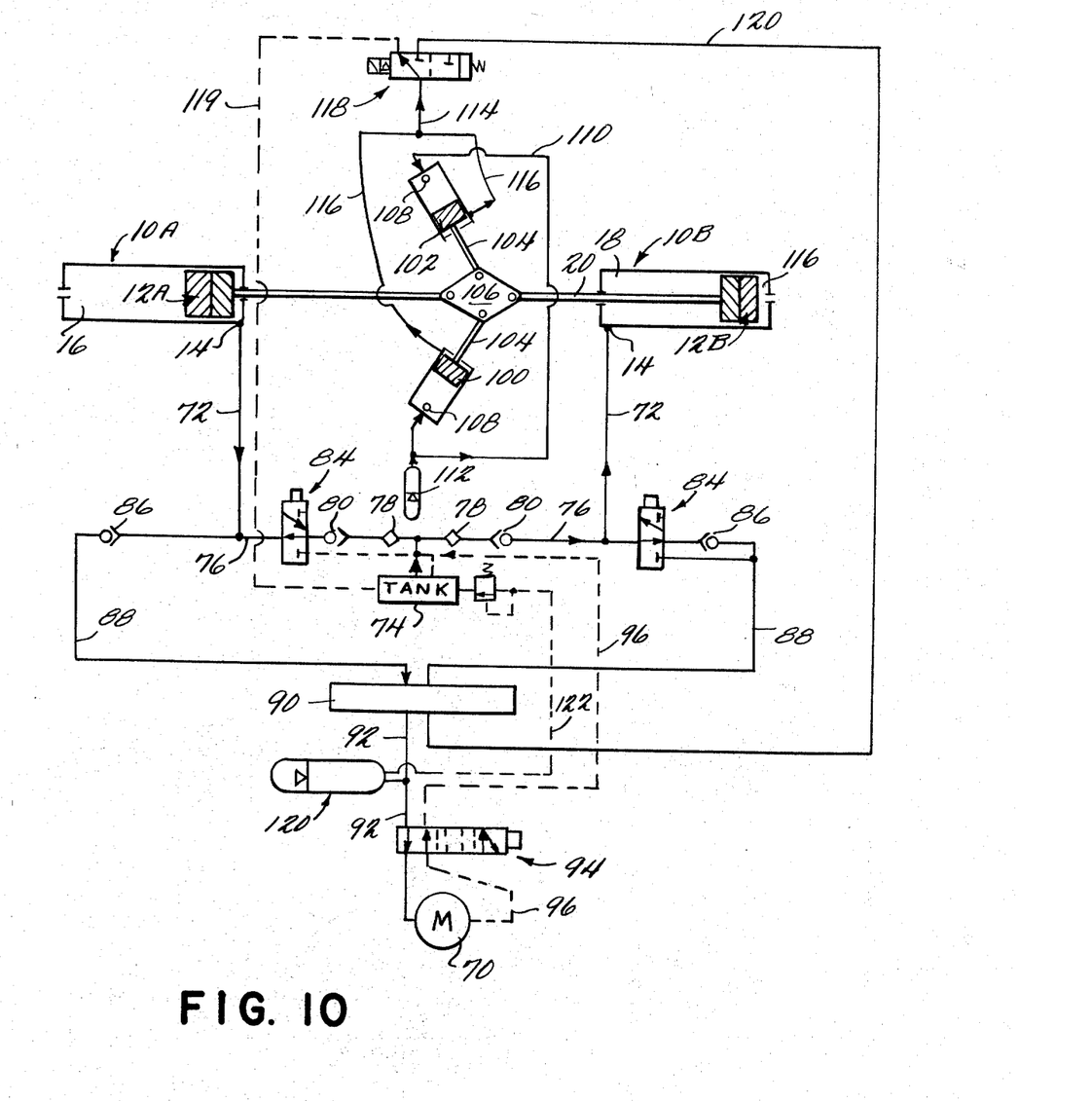
FIG. 10 is a view similar to FIGS. 8 and 9 but showing the system in an even different state of operation.

FIGS. 8 – 10 schematically illustrate a preferred embodiment of the present invention wherein a pair of main pistons are arranged on a common axis and in opposing relationship so as to alternately apply a motive force to hydraulic fluid included in a hydraulic circuit associated with the system. Furthermore, the arrangement illustrated in FIGS. 8 – 10 includes motive force control means for the main pistons, and the motive force control means comprise auxiliary piston and chamber combinations which are linked to the connecting rods of the main pistons so as to offer variable resistance and variable assistance to the travel of the main pistons during their alternating power (expansion) strokes. The illustrated arrangement produces essentially constant pressure delivery of hydraulic fluid to a motor or other power usage device.

Referring to FIG. 8, the arrangement of the preferred embodiment is illustrated with reference to a first piston means 12A sealed in a chamber 10A and mounted for reciprocation so as to receive a motive force from an internal combustion process at an end 16 of the chamber and to apply such motive force to hydraulic fluid supplied to an interior space 18 at an opposite end of the chamber. This basic arrangement is similar to that described for FIG. 1 above.

A second piston means 12B is sealed in another chamber 10B and mounted for reciprocation so as to receive its motive force from an internal combustion process at one end 16 of its chamber and to apply the motive force to hydraulic fluid supplied to an opposite end 18 of the chamber. The first and second piston means, 12A and 12B, are mounted and interlinked relative to each other so that when a motive force is applied to one of the piston means to pump hydraulic fluid from its associated chamber, a portion of that force is transferred to the other piston means to cause hydraulic fluid to be drawn into its associated chamber. This provides for an alternating pumping of hydraulic fluid by the two piston means.

A closed hydraulic circuit is included in the system depicted in FIGS. 8 – 10 for receiving a flow of high pressure hydraulic fluid from each of the first and second piston means, 12A and 12B, for ultimate delivery to a hydraulic motor means 70, or other power usage device included in the circuit. Each main piston chamber 10A and 10B is connected to a conduit 72 for pumping hydraulic fluid to and from the chamber. Hydraulic fluid is stored in a reservoir tank 74 which is in one-way communication with the conduits 72 by way of conduits 76. Each of the two conduits 76 is provided with a known filter means 78 and one-way check valve means 80 for controlling the direction of flow of hydraulic fluid. FIG. 8 illustrates the system in a state of operation in which the main chamber 10A is receiving hydraulic fluid through its associated conduit 72 by way of a port 14 of the type described with reference to FIG. 1. Hydraulic fluid is drawn into the chamber 10A as a result of a previous movement of the piston 12A toward the left in the FIG. 8 view. Movement of the piston 12A towards the left comprises a compression stroke for the piston (in the same sense as that discussed with reference to the basic arrangement shown in FIG. 1), and the piston 12A is shown in its limit compression position relative to chamber 10A, having drawn in a maximum volume of hydraulic fluid through its associated conduit 72. Thus, FIG. 8 illustrates a condition where piston 12A is in a maximum compression position in readiness to ignite, or receive ignition, of a fuel mixture contained within the combustion zone 16, which will thereby drive the piston 12A towards the right and pump hydraulic fluid from the space 18 and out through the conduit 72 to a high pressure conduit 82.

FIG. 8 also illustrates the position of piston 12B relative to its chamber 10B when the piston 12A is in its maximum compression position. As illustrated, piston 12B is in a limit position which has followed a full expansion stroke of the piston (toward the left) to receive a motive force from heated gases in the combustion zone 16 and to pump hydraulic fluid out of its port 14, through a conduit 72 and into a conduit 82. The check valve 80 prevents a backflow of the high pressure fluid into the reservoir tank 74, and all pumped fluid is directed through a starter valve 84, past a check valve 86, and into a conduit 88 leading to a high pressure manifold 90. From the high pressure manifold, high pressure hydraulic fluid can be taken off for a number of functions, the primary function being one of delivering hydraulic fluid to a conduit 92 and through a control valve 94 to a hydraulic motor 70. A low pressure conduit 96 is shown in dashed lines as communicating between the motor 70 and the reservoir tank 74. The control valve 94 includes positions for forward, reverse, and neutral operation of the motor 70.

A reciprocation of the pistons 12A and 12B towards the right results in a pumping of hydraulic fluid through the conduits and valves associated with the piston 12A in the same manner as just described for the previous pumping action of the piston 12B. In this regard, FIG. 10 illustrates the extreme limit positions for the pistons 12A and 12B after hydraulic fluid has been pumped by the piston 12A.

Alternating pumping action of the two pistons 12A and 12B, as just described above, results in an alternating pumping of hydraulic fluid through opposite sides of the hydraulic circuit so as to provide a delivery of the fluid to a motor or other power usage device. A further feature of this invention provides for a motive force control means, in the form of auxiliary hydraulic devices included in the hydraulic circuit and interconnected to the pistons 12A and 12B to (a) offer a variable resistance to travel of the two pistons during a first half of a power (expansion) stroke which pumps hydraulic fluid from an associated chamber of one of the pistons, with the variable resistance varying from a maximum resistance, when piston travel is initiated by an internal combustion process, to a zero resistance at the half-way point of travel of the piston (the FIG. 9 condition) and (b) offer a variable assistance to travel of the piston during a second half of its power stroke, with the variable assistance varying from a zero assistance, at the half-way point of travel, to a maximum assistance at the end of the power stroke of the piston. This control means serves to establish a substantially constant force on a piston so as to even out the pressure at which hydraulic fluid is pumped by the piston. In this sense, the control means acts as a "hydraulic flywheel" to establish an essentially continuous and constant high pressure flow of hydraulic fluid, on an alternating basis, from a pair of chambers to one or more hydraulic motors or other power usage devices.

In the preferred embodiment of the invention, the motive force control means comprises a pair of auxiliary piston and chamber combinations interconnected to the piston rods 20 of the first piston 12A and the second piston 12B. This arrangement is schematically illustrated in FIGS. 8 – 10. The auxiliary piston and chamber combinations include a third piston means 100 and a fourth piston means 102, each of which is mounted for reciprocation within an associated chamber which is closed at both ends and provided with inlet and outlet ports at its opposite ends. Piston rods 104 of the auxiliary pistons 100 and 102 are interconnected to a mounting plate 106 which forms a link between the piston rods of all four pistons. The mounting plate 106 may be in the form of a pair of vertically spaced plates between which the ends of the respective piston rods are secured with suitable pins and bearings. It can be seen that the piston rods 20 are axially aligned to reciprocate in a common axis extending between the two chambers 10A and 10B. On the other hand, the piston rods 104 are mounted to swing relative to the mounting plate 106 as determined by fixed pivotal mountings of the chambers associated with the auxiliary pistons 100 and 102. The fixed pivot axes for the two auxiliary chambers are located generally at the points 108 in the FIGS. 8 – 10 views. Thus, as the interlinked pistons 12A and 12B reciprocate back and forth, movement of the mounting plate 106 causes the auxiliary piston and chamber combinations to follow and to change their angular positions relative to the axis of reciprocation of the main pistons, as shown in the sequence of movements of FIGS. 8 – 10. The outermost faces of the pistons 100 and 102 are continuously pressurized with high pressure hydraulic fluid delivered to a conduit 110, which may be connected to the high pressure manifold 90 of the hydraulic circuit or to an accumulator 112, so as to maintain a substantially constant pressure on the backsides of the pistons 100 and 102 within their respective chambers. The near faces of the pistons 100 and 102 are selectively pressurized and depressurized by way of a conduit 114, communicating with ports located at near ends of each of the auxiliary chambers by way of branch conduits 116, as controlled by a solenoid control valve means 118. The control valve means 118 is shown in the FIG. 8 view in a position for dumping high pressure fluid (through a return conduit 119 to tank) from the near ends of the auxiliary chambers, and the two auxiliary pistons 100 and 102 are shown in their limit positions in readiness for a return reciprocation which will refill the near ends of their chambers through the conduit 114 communicating with a high pressure conduit 120 connected to the high pressure manifold 90. Refilling takes place when the valve means 118 is moved to the position shown in FIG. 9.

It can be seen that as the main pistons 12A and 12B move from their limit positions shown in FIG. 8 to their half-way points of travel shown in FIG. 9, there will be a variable resistance to such movement by the fact that the auxiliary pistons 100 and 102 are being pushed into their respective chambers filled with high pressure fluid on the outer ends thereof. The high pressure fluid is pushed out of the chambers through the conduit 110 and into an accumulator where it is stored for subsequent delivery back into the chambers at a later time. The resistance to travel of the main pistons 12A and 12B varies from a peak resistance in the limit position shown in FIG. 8, when a maximum force is applied to the piston 12A by completion of a combustion process within its combustion zone 16, to a zero resistance when the symmetrical half-way point has been reached by all pistons of the system as shown in FIG. 9, This resistance varies with a sine relationship. During movement of the auxiliary pistons from the positions shown in FIG. 8 to the positions shown in FIG. 9, the valve 118 is moved to the position shown in FIG. 9 to deliver high pressure fluid to the near sides of the auxiliary pistons. This means that both sides of the auxiliary pistons are subjected to high pressure fluid during a power stroke of the main piston 12A (the movement of pistons from the positions shown in FIG. 8 to the positions shown in FIG. 9), but there is a higher net force on each auxiliary piston in the direction of its associated piston rod because the surface area on the side of the piston on the side of the piston rod is smaller than the opposed surface area on the outer face of the piston.

After the system reaches the half-way point of travel shown in FIG. 9, and simultaneously with the closing of an exhaust valve in the chamber 10B (thereby beginning a compression stroke for piston 12B), the valve 118 is moved to a position to dump hydraulic fluid from the near sides of the auxiliary chambers. This position would correspond to the position shown in FIG. 10. Even if the near sides of the chambers were not depressurized, there would be a variable assistance applied to further travel of the main pistons 12A and 12B from the half-way point positions of FIG. 9 to completion of a power stroke for the piston 12A as shown in FIG. 10. This variable assistance would increase from a zero assistance at the FIG. 9 position to a maximum assistance in the limit position shown in FIG. 10. Again, the variable resistance would vary by a sine relationship based upon the changing angular relationships of the auxiliary pistons to the common axis of reciprocation of the main piston, thereby providing increasing assistance as it is needed for applying an increasing compression to a charge in the cylinder 10B. However, dumping of the near sides of the auxiliary pistons results in a further increased force of assistance as the main pistons continue a power stroke for the piston 12A from the half-way point of travel (FIG. 9) to a completion of the power stroke (FIG. 10). It can be seen that during the full power stroke of the piston 12A, the opposed piston 12B is advanced for a compression stroke. Initially, advancement of the piston 12B from the position shown in FIG. 8 to the position shown in FIG. 9 adds a negligible resistance to travel of the piston 12A. However, during the remaining half of the compression stroke of 12B, all motive force required for compressing an ignition charge within its combustion zone is applied by the auxiliary pistons 100 and 102 as they swing from the half-way positions of FIG. 9 to the full assist positions of FIG. 10. Thus, no more force than is necessary is applied to the compression stroke of each opposing piston.

Based upon the above discussion, it can be appreciated that the positions of pistons 12A and 12B can be controlled by a control of the auxiliary pistons 100 and 102. This is accomplished by an automatic control of the solenoid control valve 118 which dictates whether the near faces of the pistons 100 and 102 are pressurized or unpressurized. Timing of movement of the valve 118 can be set to achieve optimum combustion and expansion conditions within each of the main piston chambers 10A and 10B in accordance with the basic improvements in the combustion process discussed with reference to FIGS. 5 – 7. Thus, it is possible to "lock" the piston 12A in its maximum compression position shown in FIG. 8 by the fact that there is an initial high resistance to movement of the piston 12A by the pressurized auxiliary pistons 100 and 102. A very high resistance can be achieved by dumping the near sides of the auxiliary piston chambers by a movement of the valve 118 to the position shown in FIG. 8 prior to completion of the compression stroke of the piston 12A. Preferably this dumping occurs at the beginning of the compression stroke. After completion of combustion, the valve 118 can be moved to its FIG. 9 position to allow a pressurization of the near sides of the auxiliary pistons, thereby initiating a power (expansion) stroke movement of the piston 12A. In this manner, the expansion stroke of the piston 12A can be retarded until optimum combustion completion has taken place within its combustion zone 16. The same control can be applied to piston 12B.

Since the pistons 12A and 12B are not tied to the operation of a crank, they can be allowed to expand for full strokes, thereby allowing a maximum expansion of heated gases within their respective chambers, as shown by the graph of FIG. 7, prior to exhausting of the combustion products from their respective chambers 10A and 10B. Timing of opening of exhaust ports is such that full expansion strokes are accomplished before exhaust products are released, thereby resulting in a minimal rejection of heat from the system. In fact, the chambers 10A and 10B can be insulated to retain as much heat as possible within the chambers, and this is in complete contradistinction to attempts in the prior art to provide cooling of such chambers because of special frictional heat problems.

The arrangement which has been just described offers an engine design having relatively long expansion strokes (about twice as long as compression strokes, or longer) for a pair of opposed pistons, a relatively low speed operation which reduces frictional heat losses and which allows more complete combustion, and lubrication and cooling carried out by the same hydraulic fluid as is being pumped through the hydraulic circuit connected to a motor or other power usage device.

The basic arrangements of the system have been just described. However, it can be appreciated that a number of alternative arrangements and substitutions can be made in the basic plan. For example, auxiliary motor devices, such as an alternator or other power usage device required by a motor vehicle, could be inserted in the conduit 110 to receive a driving force during recharging of the accumulator 112. Likewise, an alternator or other auxiliary motor device could be included in the return conduits going back to the reservoir tank 74. The start up valves 84 are used to initially start the system. One of the start up valves 84 is included as a bypass in the high pressure conduit 88 and is moved from its illustrated position to allow delivery of high pressure fluid from the high pressure manifold 90 back to the piston chamber 10B to establish an initial compression of a charge in that chamber. At the same time, the other start up valve 84, included as a bypass in the low pressure conduit 76, is moved to allow a dumping of hydraulic fluid from the chamber 10A back to the tank 74. Thereafter, the valves 84 are moved to their normal operation positions, the charge is ignited, and the system operates as described above. A regenerative accumulator 120 may be included in the high pressure conduit 92 leading to the motor 70. This accumulator offers a primary function of receiving a storage of energy when the motor 70 is used as a regenerative braking means for the system. For example, if the motor means 70 is driving one or more wheels of a vehicle in a forward direction, the direction of flow of hydraulic fluid through the motor means can be reversed by shifting the valve 94 to a reverse flow position. This will result in a braking force applied to the motor means and to its output, and high pressure fluid will be diverted back to the regenerative accumulator 120. A separate conduit 122 is connected to the regenerative accumulator to provide for a pressure release in the event that the accumulator becomes over pressurized. The tank line 122 for the accumulator includes a pressure release valve 126 which operates to normally prevent a dumping of high pressure fluid from the accumulator, but which provides for a dumping to the reservoir, by a bypass line, when line pressures exceed a safe limit.

Figure 11:
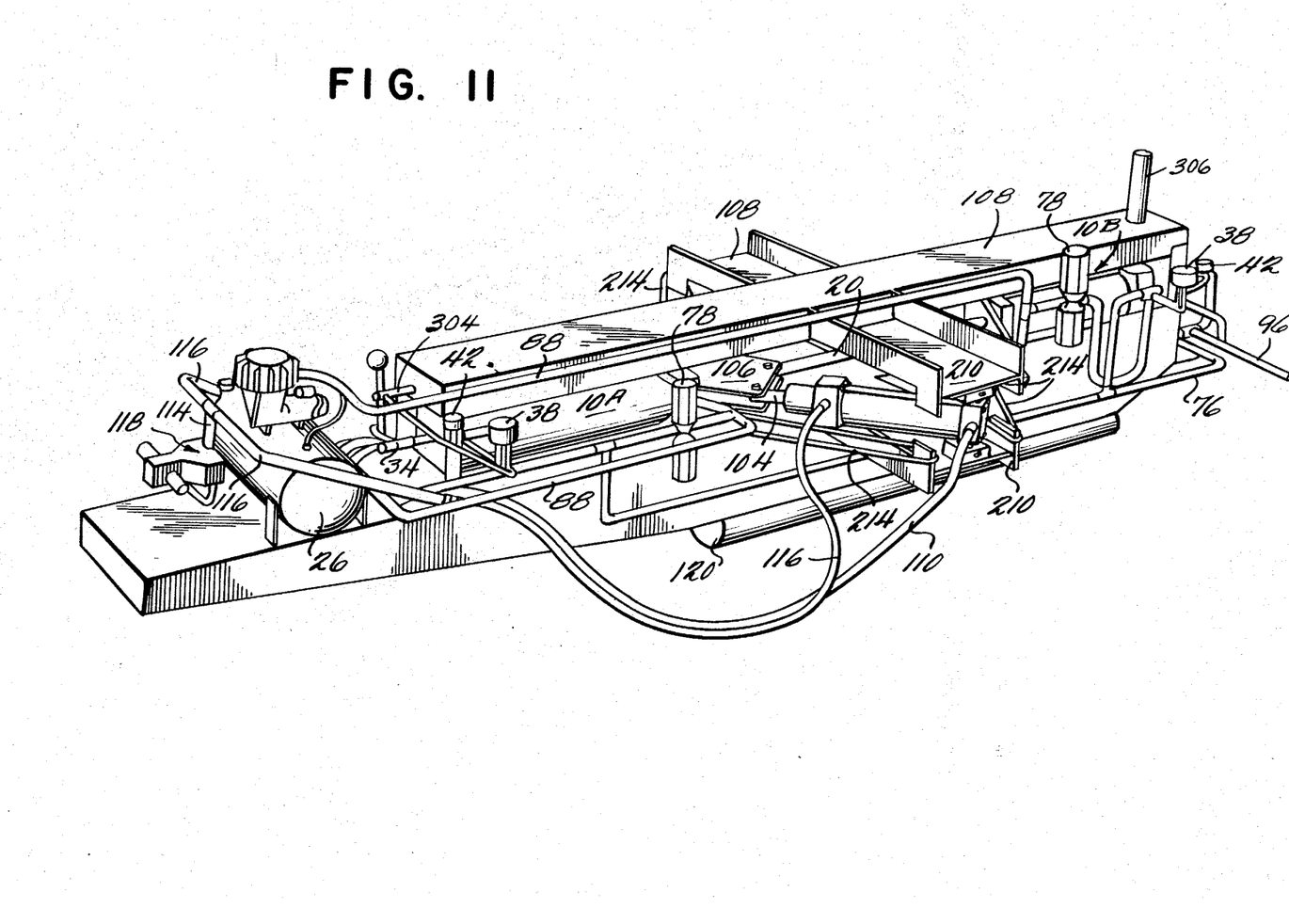
FIG. 11 is a perspective view of a reduction to practice of the present invention.
Figure 12:
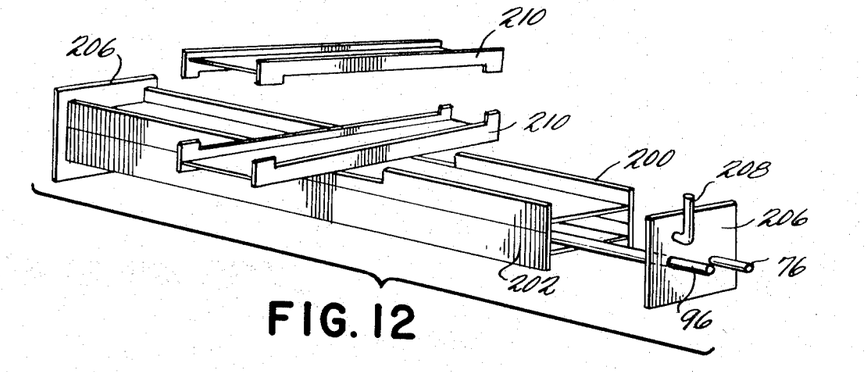
FIG. 12 is an exploded view showing certain framing assemblies of the unit shown in FIG. 11.
Figure 13:
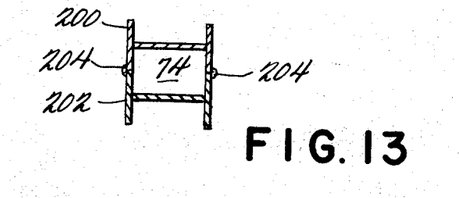
FIG. 13 is a cross-sectional view of a hydraulic fluid reservoir included within the framing assemblies shown in FIG. 12.

FIGS. 11 through 14 illustrate constructional details of a reduction to practice of the invention described above. Referring to FIG. 12, there is shown a base frame portion assembled from two standard I-beam elements to define a reservoir space within the framework. An upper I-beam element 200 is welded to a lower I-beam element 202 along their lines of contact at 204, thereby providing for an enclosed reservoir. End plates 206 are secured to the assembly to completely close off and seal the reservoir This provides for a very strong structure which can be included within the framing assembly of a truck or other motor vehicle, and the extending flanges of the two I-beams serve a further purpose of dissipating heat from the reservoir tank. As shown in FIG. 12, one end of the assembly is provided with a filler inlet 208 for admitting hydraulic fluid to the reservoir, a suction line conduit corresponding to the conduit 76 of FIGS. 8 – 10, and a return conduit corresponding to the conduit 96 of the FIGS. 8 – 10. The return conduit 96 includes an extended pipe portion which extends along the entire length of the reservoir so that hydraulic fluid returning to the tank is delivered to an opposite end of the reservoir from where it is removed through the suction line 76. The return conduit also provides a means by which the tank can be cleaned by attaching it to the suction of a vacuum cleaning device whenever cleaning maintenance is required.

FIG. 12 also illustrates relative placement of upper and lower cross beam members 210 which function to support the auxiliary pistons 100 and 102 and their associated chambers for pivotal swinging about the axes 108 (shown also in FIG. 11). The cylinders of the auxiliary pistons are mounted between bearing blocks which can be lubricated to provide for a low friction swinging of the assisting cylinders as the main pistons reciprocate back and forth.

Figure 14:
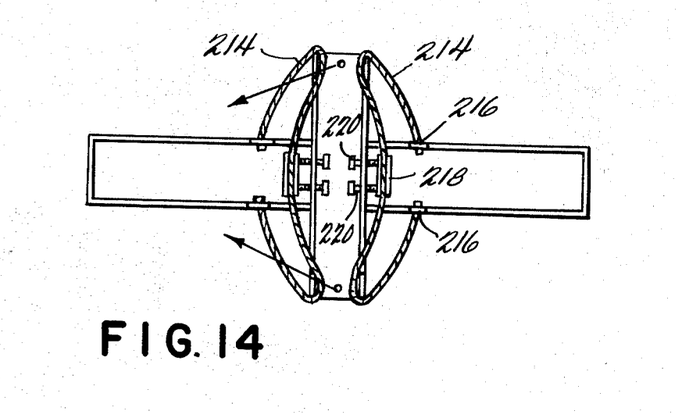
FIG. 14 is a top plan view of a stress compensation system incorporated into the framing assemblies of FIG. 12.

FIG. 14 illustrates a stress compensation arrangement for the cross beam members 210 so as to compensate for very heavy loads applied thereto as the main pistons reciprocate back and forth and the auxiliary pistons resist and assist such motion. In the illustrated arrangement a cable 214 is tensioned around upstanding flanges at each end of the cross beam members (the same arrangement being applied to both upper and lower cross beam members 210) to resist stresses applied to the cross beam member. FIG. 14 illustrates force components, by arrows, which are resisted by the cable shown at the righthand side of the drawing. Each cable is anchored at its end to fixed portions 216 of the main frame assembly and is strung around upstanding end portions of the cross beam member and through an adjustable block 218 which can be manually adjusted with threaded screws 220 to adjust the tension on the cable.

As an example of a typical assembly of the engine of this invention, of the type shown in FIG. 11, a pair of opposed main pistons 12A and 12B are carried within respective cylinders 10A and 10B having internal diameters of 6 inches and overall lengths of approximately 28 inches. The piston rods 20 of each of the main pistons are 28 inches long, and the travel of each main piston within its respective cylinder is about 20 inches. The 20 inch travel corresponds to an expansion stroke for each piston, and its compression stroke is about 10 inches. The auxiliary pistons are each 6 inches in diameter and are provided with 4 inch diameter connecting rods 104 so that the surface area on the inward side of each auxiliary piston is one-half the area of the surface on its outward face. In the example construction the auxiliary pistons are designed to travel approximately 3 inches in cylinders having a 12 inch overall length. The range of angular displacement of the assisting pistons, relative to the common axis of reciprocation of the main pistons, is 30 degrees on each side of the center position (FIG. 9). The example construction is operated at combustion zone pressures of approximately 600 psia prior to ignition, followed by pressures ranging from 1,200 to 2,500 psia after ignition. Hydraulic pressure of about 1,000 psia is developed by the power strokes of the main pistons. In the example, air is supplied to the combustion zone under a pressure of 100 psia from a source which provides that pressure. Fuel is introduced into the combustion zone (after compression) with a known injector means which supplies the fuel into the combustion zone at about 3,000 psia. After combustion and expansion of gases within the combustion chamber, scavenging air is introduced into the chamber when the chamber conditions drop below 100 psia. The injector chamber 34 functions as a pre-combustion chamber to mix fuel and air and can be insulated to reduce thermal losses.

The FIG. 11 arrangement also provides for a water bath treatment of exhaust products which are introduced into a combination water bath and muffler chamber 300. Exhaust products are removed from each cylinder 10A and 10B, through their associated exhaust valve assemblies 38, and from there the exhaust products are introduced into one end of the relatively long water bath and muffler chamber through a pipe connection 304. The gases pass along the entire length of the chamber, through a volume of water contained therein, and are finally exhausted through an outlet stack 306. Baffles may be included in the water bath and muffler chamber to reduce surging, if desired.

In addition to the above features, the engine can be provided with certain other improvements. For example, each combustion chamber can carry a refractory end plate which is porous, and which may include catalytic additives therein, for diffusing a fuel charge into the combustion zone. This improves the combustion process by causing a low temperature, more complete combustion and a relative lessening of irreversible thermodynamic heat exchange losses. Although it is preferred that the main chambers 10A and 10B be of volumetric capacities for the type of system which has been illustrated, it is possible to use chambers having differing capacities and to utilize the differing delivery volume from one chamber for carrying out other power functions or for providing deliveries at different pressures.

The engine design which has been discussed above is simple in construction, reliable, and low in maintenance requirements. It runs quietly with a low level of vibration, and it lends itself to numerous transportation needs where hydraulic motors are provided in one or more wheels of a vehicle. Since there are no main bearings in the engine, of the type typically incorporated into crank type engines, very high pressures can be utilized as working pressures for the system. For example, the pistons 12A and 12B are typically subjected to forces as high as, or exceeding, 3,000 lbs per square inch, thereby allowing for very high pressure and force operations not attainable in conventional engine designs. Furthermore, various accessories on the engine, such as fuel injectors, exhaust valves, and other items connected to the engine cylinders, can be easily disconnected for repair or maintenance without disassembline basic structures of the engine.

Although the invention has been discussed with reference to specific embodiments, it will be appreciated that equivalent substitutions and obvious changes can be made in these embodiments. All such substitutions and changes are intended to be included within the scope of protection defined in the claims which follow.

What is claimed is:

1. A low pollution, high efficiency engine capable of producing a substantially constant-pressure fluid flow in a hydraulic power system associated with the engine, comprising a chamber means for containing an internal combustion process and for receiving and discharging a flow of hydraulic fluid, a piston means mounted within said chamber means for receiving motive force from the internal combustion process contained within said chamber means and for imparting the motive force to a volume of hydraulic fluid supplied to the chamber means, said piston means further functioning to seal said volume of hydraulic fluid from said combustion process, gas supply means for delivering a combustion supporting gas to a combustion zone within said chamber means, fuel supply means for delivering a combustible fuel to said combustion zone within said chamber means, means for moving said piston means within said chamber means through a compression stroke which compresses a mixture of said gas and said fuel, means for initiating ignition of a heat generating combustion process within the chamber, means for retarding movement of said piston means away from its maximum compression position to thereby maintain a substantially constant volume within said combustion zone during substantial completion of said combustion process to develop nearly theoretical maximum pressure and heat conditions within the combustion zone prior to any increase in volume of said combustion zone, means for releasing said piston means after substantial completion of said combustion process to allow said piston means to travel through an expansion stroke which receives its motive force from said combustion process and which imparts the motive force to a volume of hydraulic fluid contacted by said piston means within said chamber means, thereby causing the hydraulic fluid to be discharged from the chamber means, and means for exhausting combustion products from said chamber means upon completion of an expansion stroke of said piston means.

2. The engine of claim 1 wherein said means for initiating ignition comprises said means for moving said piston, said piston being moved through a compression stroke which compresses a mixture of said gas and said fuel sufficiently to initiate a compression ignition of said combustion process.

3. The engine of claim 1 wherein said piston means is mounted for reciprocation within a cylindrical chamber means, and wherein (a) said compression stroke of said piston means is defined as the length of travel of the piston means in a first direction from the point at which an exhaust valve of the chamber means is closed to the point at which maximum compression takes place, and (b) said expansion stroke of the piston means is defined as the length of travel of the piston means in an opposite direction from said first direction as measured from the point at which maximum compression takes place to the point at which said exhaust valve is opened to discharge combustion products from said chamber means.

4. The engine of claim 3 wherein said expansion stroke is longer than said compression stroke.

5. The engine of claim 1 wherein said chamber means is lubricated internally and cooled by said hydraulic fluid being supplied to and discharged from said chamber means.

6. The engine of claim 1 and including motive force control means for controlling the rate of travel of said piston means during its expansion stroke to thereby provide for a substantially constant-pressure delivery of hydraulic fluid through a hydraulic circuit communicating with said chamber means.

7. The engine of claim 6 wherein said motive force control means functions to maintain a substantially constant force differential on opposite sides of said piston means during its expansion stroke travel.

8. The engine of claim 6 wherein said motive force control means comprises auxiliary hydraulic means included in said hydraulic circuit and interconnected to said piston means to (a) offer a variable resistance to travel of the piston means during a first half of its expansion stroke, said variable resistance varying from a maximum resistance, when piston travel is initiated after maximum compression, to a zero resistance at the half-way point of travel of the piston means and (b) offer a variable assistance to travel of the piston means during a second half of its expansion stroke, said variable assistance varying from zero assistance, when the piston means is at its half-way point of travel, to a maximum assistance at the end of the expansion stroke of the piston means.

9. The engine of claim 6 wherein said means for retarding and releasing said piston means at the time of combustion comprises control means operatively associated with said auxiliary hydraulic means to provide for momentary hydraulic "locking" of the piston means in its maximum compression position followed by a hydraulic release of the piston means for carrying out its expansion stroke.

10. The engine of claim 1 wherein said means for moving said piston means through a compression stroke includes a second piston means mounted within a second chamber means for containing an internal combustion process and for receiving and discharging a flow of hydraulic fluid in the same manner as defined for the first-named piston and chamber combination, said second piston means being mounted in opposing relationship and on a common axis of movement relative to the first-named piston means so that a portion of the motive force of an expansion stroke of either piston means is stored and applied to a compression stroke of the other piston means.

11. The engine of claim 10 wherein energy from an expansion stroke of either of said first and second pistons is stored in said auxiliary hydraulic means so that all of the energy required for moving said first and second pistons through compression strokes is provided by said auxiliary hydraulic means.

12. The system of claim 10 wherein said auxiliary hydraulic means comprise third and fourth piston means mounted for reciprocation within respective chambers which are in communication with said hydraulic circuit so that back ends of said third and fourth piston means are continuously pressurized within their respective chambers by high pressure fluid delivered from said hydraulic circuit while opposite ends of the third and fourth piston means are selectively pressurized and depressurized with hydraulic fluid flow received from and dumped into said hydraulic circuit, said opposite ends of said third and fourth piston means carrying piston rod means which are connected to said aligned piston rod means of said first and second piston means from lateral positions on each side of a common axis of travel of the first and second piston means, and said chambers of the third and fourth piston means being mounted to follow changing angular relationships between all of the said piston rod means as said first and second piston means are reciprocated back and forth in their respective chambers.

13. The engine of claim 1 wherein said gas supply means is connected to a source of compressed combustion supporting gas so as to supply compressed gas to the combustion zone within said chamber means.

14. The engine of claim 13 and including a one-way valve means for automatically controlling a continuous supply of compressed gas to said gas supply means whenever pressure conditions within the combustion zone of said chamber means are lower than the pressure of said compressed gas, thereby providing for a continuous scavenging of said chamber means at the end of its expansion stroke.

15. The engine of claim 1 wherein said means for exhausting comprises an exhaust valve means which is detachably mounted to an outside surface of said chamber means for providing a communication with the interior of said chamber means.

16. The engine of claim 15 wherein said exhaust valve means includes a valve element which is moved between positions for closing and opening an exhaust port by fluid pressure differentials.

17. A system for producing substantially constant-pressure hydraulic power with an internal combustion process, comprising a first piston means sealed in a chamber and mounted for reciprocation so as to receive a motive force from an internal combustion process at one end of the chamber and to apply such motive force to hydraulic fluid supplied to an opposite end of the chamber, a second piston means sealed in another chamber and mounted for reciprocation so as to receive a motive force from an internal combustion process at one end of its chamber and to apply such motive force to hydraulic fluid supplied to an opposite end of its chamber, and said first and second piston means being mounted and interlinked relative to each other so that when a motive force is applied to one of said piston means to pump hydraulic fluid from its associated chamber, a portion of that force is transferred to the other of said piston means to cause hydraulic fluid to be drawn into its associated chamber, thereby providing for an alternating pumping of hydraulic fluid by the two piston means, a closed hydraulic circuit for receiving a flow of high pressure hydraulic fluid from each of said first and second piston means for ultimate delivery to motor means or other power usage device, and included in said circuit, a low pressure reservoir supply of hydraulic fluid connected for delivery of hydraulic fluid to the chambers of each of said first and second piston means for supplying hydraulic fluid alternately to the respective chambers in accordance with directions of reciprocation of the first and second piston means, and motive force control means for controlling the pumping actions of said first and second piston means to thereby produce a substantially constant-pressure delivery of hydraulic fluid to said motor means, or said other power usage device, connected to said hydraulic circuit.

18. The system of claim 17 wherein said first and second piston means and their associated chambers are identical in volumetric capacities.

19. The system of claim 17 wherein said motive force control means comprises auxiliary hydraulic means included in said hydraulic circuit and interconnected to said first and second piston means to (a) offer a variable resistance to travel of said first and second piston means during a first half of a power stroke which pumps hydraulic fluid from an associated chamber of each piston means, said variable resistance varying from a maximum resistance, when piston travel is initiated by said internal combustion process, to a zero resistance at the half-way point of travel of the piston and (b) offer a variable assistance to travel of said first and second piston means during a second half of said power stroke, said variable assistance varying from a zero assistance, at said half-way point of travel of the piston, to a maximum assistance at the end of the power stroke travel of said piston.

20. The system of claim 17 wherein said first and second piston means are mounted in opposing relationship in a support frame structure, and including aligned piston rod means connected to each of said piston means and to each other so as to form a rigid interconnection between said piston means.

21. The system of claim 20 wherein said motive force control means comprise a pair of auxiliary piston and chamber means interconnected to said piston rod means of said first and second pistons to offer variable resistance and variable assistance to travel of said piston means during their alternating power strokes.

22. The system of claim 19 wherein said auxiliary hydraulic means comprise third and fourth piston means mounted for reciprocation within respective chambers which are in communication with said hydraulic circuit so that back ends of said third and fourth piston means are continuously pressurized within their respective chambers by high pressure fluid delivered from said hydraulic circuit while opposite ends of the third and fourh piston means are selectively pressurized and depressurized with hydraulic fluid flow received from and dumped into said hydraulic circuit, said opposite ends of said third and fourth piston means carrying piston rod means which are connected to said aligned piston rod means of said first and second piston means from lateral positions on each side of a common axis of travel of the first and second piston means, and said chambers of the third and fourth piston means being mounted to follow changing angular relationships between all of the said piston rod means as said first and second piston means are reciprocated back and forth in their respective chambers.

23. The system of claim 17 wherein said chambers of said first and second piston means are each provided with a gas supply means connected to a source of oxygen-containing gas for supplying compressed gas to a combustion zone within each of said chambers.

24. The system of claim 23 and including a one-way valve means for automatically controlling a continuous supply of compressed gas to said gas supply means whenever pressure conditions within the combustion zone of said chamber means are lower than the pressure of said compressed gas, thereby providing for a continuous scavenging of said chamber means at the end of its expansion stroke.

25. The system of claim 17 wherein said chambers of said first and second piston means are each provided with an exhaust valve means for exhausting combustion products from a combustion zone within each chamber.

26. The system of claim 17 wherein said hydraulic circuit includes an accumulator means.

27. The system of claim 17 wherein said system is mounted in a vehicle frame to function as a prime mover for the vehicle, and including hydraulic motor means driven by high pressure hydraulic fluid flow for driving wheel or track means of said vehicle.

28. The system of claim 27 and including a reservoir tank in said hydraulic circuit for storing hydraulic fluid, said reservoir tank being carried within frame members of said vehicle.

29. The system of claim 17 wherein exhaust products from said internal combustion process are exhausted from said chambers to a water bath muffler means.

30. The system of claim 17, and including means for reversing flow of hydraulic fluid through said motor means or other power usage device.

31. The system of claim 30 and including an accumulator in circuit to receive a reverse flow of hydraulic fluid from said motor means or other power usage device.

32. The system of claim 17, and including a starting valve means in said hydraulic circuit for controlling a delivery of hydraulic fluid to one of said chambers to compress an initial charge of combustible gas.

33. The system of claim 17 wherein each of said chambers is provided with a porous refractory end plate through which a pressurized combustible fluid is diffused.

34. In a process for increasing useful energy output available from an application of heat energy to a piston means carried for movement within a chamber means, the improvement comprising
maintaining a substantially constant volume within a combustion zone portion of said chamber means during substantial completion of a combustion process initiated in said combustion zone so as to develop, within said combustion zone, pressure and heat conditions approaching theoretical maximums for the combustion process prior to any increase in volume of said combustion zone, and thereafter
moving said piston means within said chamber means by an expansion and cooling of gases within said combustion zone,
continuing said step of moving until the gases within the combustion zone are substantially fully expanded, and
delaying opening of an exhaust valve in said chamber until full expansion of gases has been completed, thereby substantially reducing heat rejection from the chamber.

35. The process of claim 34 wherein said step of moving said piston means defines an expansion stroke for the piston means.

36. The process of claim 35 and including a step of moving said piston means through a compression stroke prior to initiation of said combustion process.

37. The process of claim 36 wherein said expansion stroke is longer than said compression stroke.

38. The process of claim 34 wherein ignition of said combustion process is initiated by a compression of gases by said piston means.

39. The process of claim 34 and including a step of maintaining a substantially constant force on said piston means while the piston means is moving hydraulic fluid so as to deliver said hydraulic fluid at a substantially constant pressure to a power usage device.

* * * * *